Figures 1, 2:
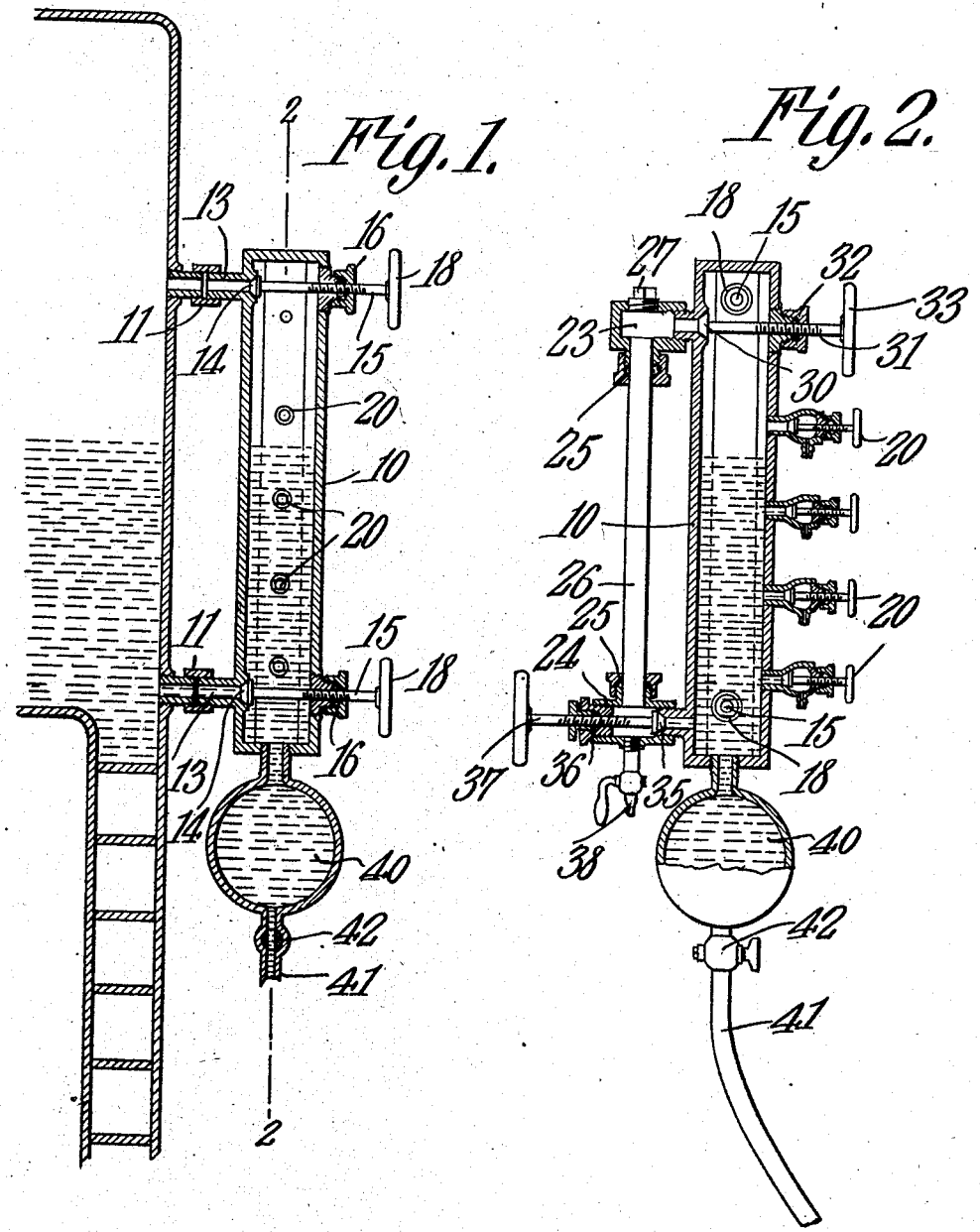

J. L. VAUGHAN.
WATER GLASS AND GAGE COCK FOUNTAIN.
APPLICATION FILED FEB. 21, 1908.

911,786.

Patented Feb. 9, 1909.

WITNESSES:

James L. Vaughan,
INVENTOR.

By C. A. Snow & Co.
ATTORNEYS

UNITED STATES PATENT OFFICE.

JAMES LEWIS VAUGHAN, OF DEARING, KANSAS.

WATER-GLASS AND GAGE-COCK FOUNTAIN.

No. 911,786.  Specification of Letters Patent.  Patented Feb. 9, 1909.

Application filed February 21, 1908. Serial No. 417,138.

*To all whom it may concern:*

Be it known that I, JAMES LEWIS VAUGHAN, a citizen of the United States, residing at Dearing, in the county of Montgomery and State of Kansas, have invented a new and useful Water-Glass and Gage-Cock Fountain, of which the following is a specification.

This invention relates to gage cocks, and glasses for steam boilers.

One of the principal objects of the invention is to provide a device of this class in which all of the gage cocks, the glass and the glass connections may be removed from the stand pipe without the necessity of blowing off steam.

A further object of the invention is to provide a novel construction of stand pipe and to so arrange the glass connections as to prevent to a considerable extent the fouling of the glass and valve seats by deposits.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in form, proportions, size and minor details of the structure may be made without departing from the spirit or sacrificing any of the advantages of the invention.

In the accompanying drawings:—Figure 1 is a vertical section of a gage constructed in accordance with the invention. Fig. 2 is a vertical sectional view of the same on the line 2—2 of Fig. 1.

Similar numerals of reference are employed to indicate corresponding parts throughout the several figures of the drawings.

In carrying out the invention, a stand pipe 10 of suitable size and shape is coupled to the head of the boiler by unions 11, one connection being below the normal water line, and the other above the normal water line, as usual. In the nipples 13 which extend from the stand pipe to the unions 11 are formed seats for the reception of valves 14 that are carried by stems 15, the latter extending through suitable stuffing boxes 16 at the front of the stand pipe, and being provided with operating handles 18, so that by turning these handles the valves may be opened and closed.

Extending from one side of the stand pipe are gage cocks 20, the number of cocks employed being in accordance with the size of the boiler, four of such cocks being used in the present instance, three for water tests, and one for steam test.

At that side of the stand pipe opposite the gage cocks are fitted two valve chambers 23 and 24, and these are provided with stuffing boxes 25 for the reception of a gage glass 26. The top of the casing 23 is provided with a removable plug 27 that is in alinement with the gage glass, and is of such diameter that when removed a new gage glass may readily be placed in position without the necessity of blowing off steam.

At the connection between the stand pipe and the casing 23 is a seat for a valve 30 that is carried by a stem 31, the latter passing through a stuffing box 32 at the opposite side of the stand pipe, and being provided with an operating handle 33. This valve may be closed when the gage glass is to be replaced, it being observed that the stem will not extend across the vertical plane of the gage glass, and thus interfere with the introduction of the latter.

The lower valve casing 24 carries a seat for a valve 35 that extends through a stuffing box 36 and carries a handle 37. This valve is also closed when a new glass is to be inserted. At the bottom of the casing 24 is a pet cock 38 which may be opened when necessary.

All of the gage cock and water glass connections are above the bottom of the stand pipe, and to the extreme lower end of the latter is connected a mud drum 40 in which sediment may accumulate, and which being in a direct line will catch most of the sediment, so that there will be no danger of any accumulation on the several valve seats. The mud drum is connected to a blow off pipe 41 by a valve 42 which may be opened as required for the purpose of blowing out the sediment.

It will be observed that by closing the upper and lower valves 14 that all communication between the boiler and the stand pipe will be cut off, so that all of the gage cock and glass connections of the stand pipe may be removed for cleansing or other purposes without the necessity of blowing off steam.

I claim:—

1. In an apparatus of the class described, a stand-pipe, upper and lower nipples by which the stand-pipe is placed in communication with a boiler, each nipple being provided with a valve seat, valve stems extending through the stand-pipe and provided with valves for engagement with the seats for closing communication between the stand-pipe and boiler, spaced valve casings extending laterally from the stand pipe, a gage glass connecting the valve casings, and gage cocks communicating with the interior of the stand-pipe.

2. In an apparatus of the class described, a stand-pipe, means for coupling the stand-pipe to a boiler at points above and below the normal water line, the coupling connections having valve seats, valve-stems extending transversely through the stand-pipe and carrying valves arranged to close against said seats to cut off communication between the boiler and stand-pipe, spaced valve casings extending laterally from the stand-pipe and disposed at substantially right angles to the coupling connections, a gage glass connecting the valve casings, valves for controlling the flow of fluid from the stand pipe to the gage glass, and gage cocks communicating with the interior of the stand-pipe and arranged opposite the gage glass.

3. In an apparatus of the class described, a stand-pipe, upper and lower nipples by which the stand-pipe may be placed in communication with the boiler, said nipples being provided with valve seats, valve stems extending transversely through the stand-pipe and provided with valves arranged to engage said seats, a mud drum communicating with the bottom of the stand-pipe, valve casings extending laterally from the stand-pipe, a gage glass connecting the casings, a valve stem extending through the stand-pipe and provided with a valve for controlling the flow of fluid through one of the casings of the gage glass, a valve independent of the stand-pipe and operating within the other casing for controlling the flow of fluid through said casing, and gage cocks communicating with the stand-pipe at points above the bottom thereof.

In testimony that I claim the foregoing as my own, I have hereto affixed my signature in the presence of two witnesses.

JAMES LEWIS VAUGHAN.

Witnesses:
C. A. LEE,
AARON GARVERICK.